United States Patent [19]

Sakagami et al.

[11] Patent Number: 5,511,487
[45] Date of Patent: Apr. 30, 1996

[54] TRANSPORT SYSTEM WITH ELECTRIC MOVERS

[75] Inventors: Tatsuya Sakagami, Kobe; Yoshito Kaida, Itami, both of Japan

[73] Assignee: Daifuku Co., Ltd., Osaka, Japan

[21] Appl. No.: 364,604

[22] Filed: Dec. 27, 1994

[30] Foreign Application Priority Data

Apr. 14, 1994 [JP] Japan .................................... 6-075640

[51] Int. Cl.⁶ ..................................................... B61K 7/00
[52] U.S. Cl. .......................... 104/252; 104/288; 104/295; 104/249; 104/251
[58] Field of Search ..................................... 104/249, 251, 104/252, 254, 295, 288, 296, 89, 93, 172.4, 88.01, 88.02; 105/149

[56] References Cited

U.S. PATENT DOCUMENTS

| | | | |
|---|---|---|---|
| 3,314,376 | 4/1967 | Lerch et al. | 104/252 |
| 3,397,650 | 8/1968 | Kondur et al. | 104/249 |
| 3,437,054 | 4/1969 | Bishop | 104/249 |
| 3,477,390 | 11/1969 | Dolding | 104/251 |
| 3,503,471 | 3/1970 | Balke | 104/249 |
| 3,648,619 | 3/1972 | Wilkinson | 104/252 |
| 3,696,756 | 10/1972 | Elmore et al. | 104/251 |
| 3,892,186 | 7/1975 | Pipes et al. | 104/249 |
| 3,948,187 | 4/1976 | Moore | 104/252 |
| 4,941,555 | 7/1990 | Antunes | 104/295 |

FOREIGN PATENT DOCUMENTS

| | | | |
|---|---|---|---|
| 40471 | 3/1979 | Japan | 104/249 |
| 854824 | 8/1981 | U.S.S.R. | 104/251 |
| 1648861 | 5/1991 | U.S.S.R. | 104/249 |

*Primary Examiner*—Mark T. Le
*Attorney, Agent, or Firm*—Schweitzer Cornman & Gross

[57] ABSTRACT

A transport system having (i) electrical movers for moving in a travel direction along a guide rail, each having (a) a drive wheel, (b) a brakeless electric motor for rotating the drive wheel, (c) a photoelectric switch adapted to sense the proximity of an object, (d) a contact member for stopping movement of the electric mover at a predetermined location, the photoelectric switch being disposed in the travel direction ahead of said contact member for switching the supply of electrical power to the motor upon sensing or ceasing to sense a previously sensed proximity of an object, and (ii) a stopping mechanism located along the guide rail for stopping the movement of an electric mover, including (a) a stopper adapted in an operative position thereof to stop a moving electrical mover by contact with the contact member, and to allow movement of the electrical mover when the stopper is not in its operative position, (b) a shifter for shifting the stopper in and out of its operating position, and (c) a detectable member shiftable by the shifter to a position perpendicularly to the travel direction when the detectable member is shifted to said perpendicular position, it can be sensed by the photoelectric switch before contact between the stopper and the contact member.

7 Claims, 6 Drawing Sheets

FIG. 8 ary. The brake of the
TRANSPORT SYSTEM WITH ELECTRIC MOVERS

FIELD OF THE INVENTION

The present invention relates to a transport system for transporting work pieces along a path, and a stopping mechanism for halting an electric mover guided automatically to move along a guide rail.

BACKGROUND OF THE INVENTION

Electric movers or cars in prior art transport systems of this type usually have wheels driven by electric motors and having a built-in brake. The brake not only increases the manufacturing cost of the system, but also makes it more complex to operate, more particularly the brake has to be deenergized whenever the electric mover is operated manually or is driven by an auxiliary conveyor. The brake of the electric mover has to be energized again when it is intended to stop moving.

Therefore, a need exists for a new type of transport system with a brakeless electric motor as its prime mover. The electric mover in this case must easily be controllable to stop at a given station or to stay sidelined. We have in the past proposed to meet these requirements by transport systems having a first and second stop switches to cut off the supply of power to each brakeless motor. The first switch is installed in a switchboard of a stopping mechanism and is manually operable to halt each electric mover at a given station. The second stop switch is provided on each electric mover whereby a member protruding rearwardly from a preceding electric mover actuates the second switch of a following mover when the latter approaches the former closer than a predetermined distance. The two stop switches and their accessories and their operation present various problems that complicate the transport system.

SUMMARY OF THE INVENTION

It is an object of the present invention to provide an improved transport system comprising a plurality of electric movers each driven by a brakeless motor, and each electric mover can be easily stopped at a desired station and/or to stay sidelined.

The transport system of the present invention has at least one electric mover and a stopping mechanism, wherein each electric mover has a drive wheel, a brakeless motor for rotating the drive wheel, a photoelectric switch for deenergizing the brakeless motor, a contact member for stopping the electric mover, and a first detectable member which can be sensed and actuated to stop a following electric mover. A first photoelectric switch can cut off the supply of power to the brakeless motor. The first detectable member protrudes rearwardly from each electric mover and extends to a distance along the direction of travel of the mover. A second photoelectric switch on a following electric mover faces and senses the proximity of the first detectable member of the preceding electric mover, when the latter mover approaches the following mover closer than by predetermined distance.

The stopping mechanism at a desired stopping location, has a stopper for bearing against the contact member of the electric mover to be stopped, a second detectable member and a shifter. The shifter is operable to retracts the stopper and the second detectable member from their operating or stopping positions. The second detectable member extends to a distance in the travel direction. When this detectable member is shifted to its operative position, it faces the photoelectric switch, and can thus be sensed by it, before contact of the stopper with the contact member.

In the transport system of the present invention, a timer can be employed to resume supplying power to the brakeless motor after the passing of a predetermined time after the photoelectric switch stopped sensing. The second detectable member of the stopping mechanism which can face the photoelectric switch can be disposed at a level different than that of the first detectable member carried by the electric mover.

DESCRIPTION OF THE DRAWING

The invention is described in greater detail by reference being had to the drawing, wherein.

DETAILED DESCRIPTION OF THE INVENTION

Figure 1:
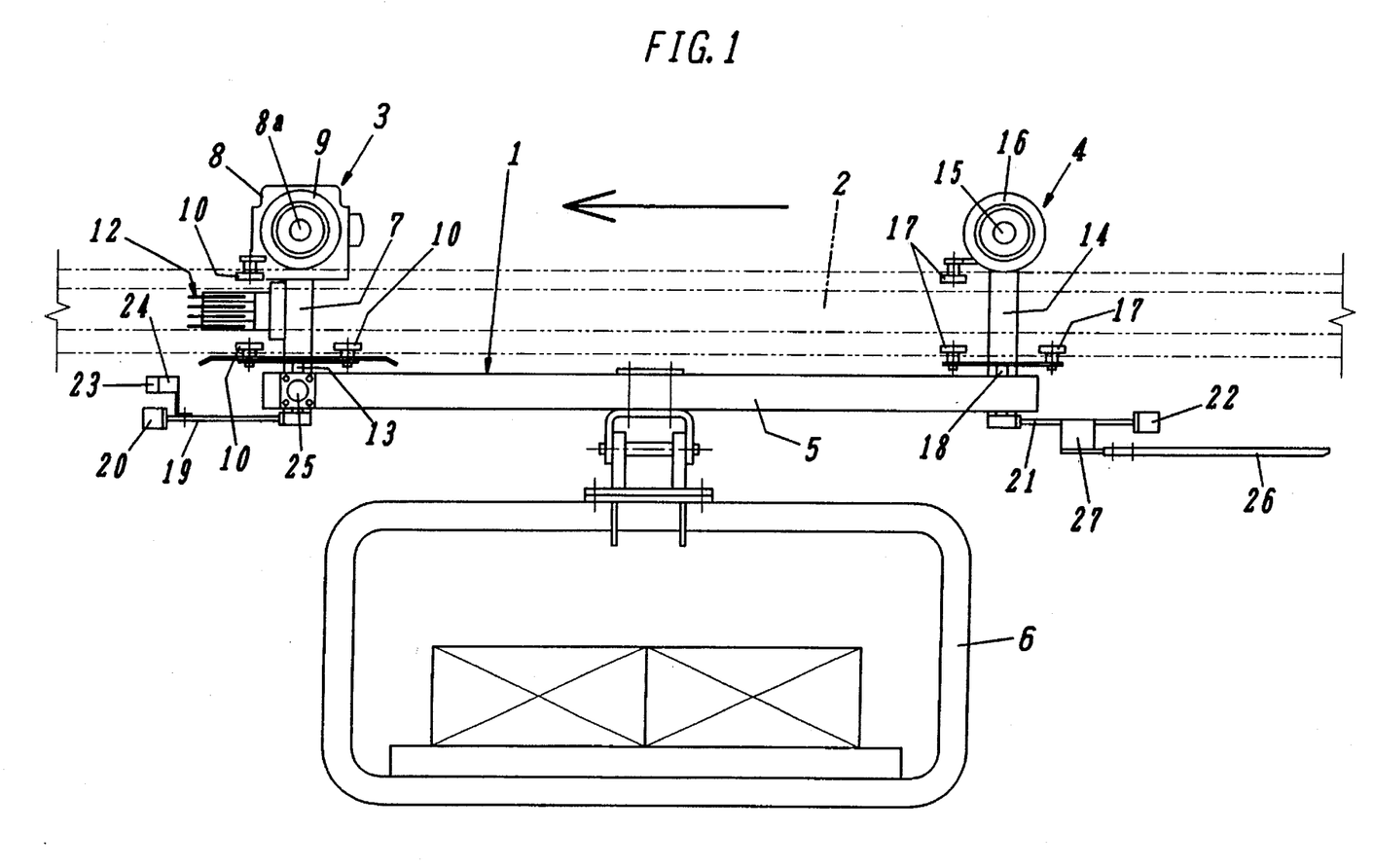
FIG. 1 is a side elevational view of a transport system of the present invention showing a guide rail in broken lines.
Figure 2:
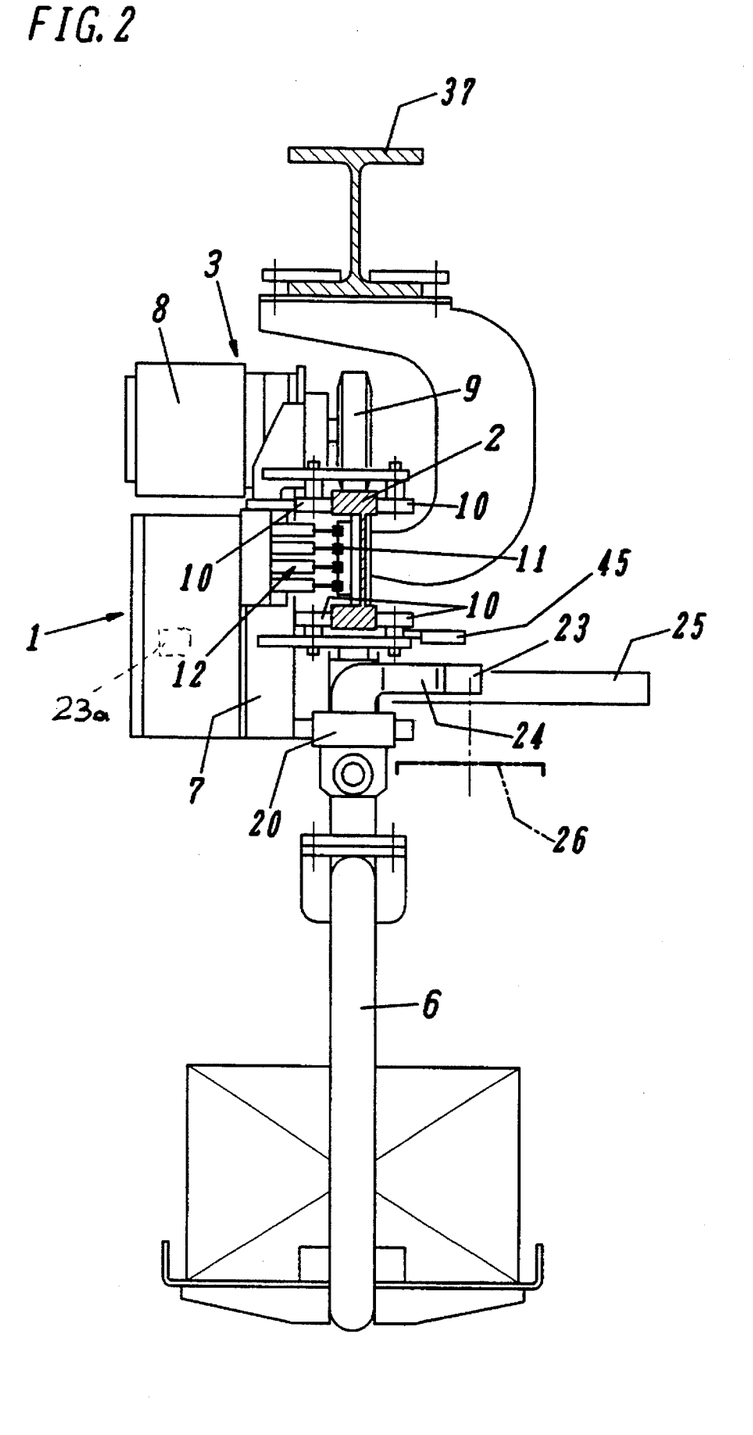
FIG. 2 is a front elevational view of the system of FIG. 1 with parts thereof being shown in cross section.

As shown in FIGS. 1 and 2, an electric mover 1 is guided for automatically advancing along a guide rail 2. The electric mover 1 includes a drive trolley 3 and an idler trolley 4, which are connected one to another by a loading bar 5. A hanging platform 6 depends from the loading bar 5 and supports and carries an article 'W' to be transported.

The drive trolley 3 has a trolley body 7, a brakeless motor 8, a drive wheel 9, lateral rollers 10, and a collector 12. The trolley body 7 is disposed at one side of the guide rail 2, and the motor 8 having a speed reducer, is secured to a top of the trolley body 7. The drive wheel 9 that is connected to an output shaft 8a a of the motor rolls on an upper surface of the guide rail 2. The lateral rollers 10 are each journaled on a vertical shaft and are disposed on both sides of the guide rail. Top and bottom portions of the guide rail 2 are engaged by the lateral rollers to keep the trolley from rocking sideways, or from rocking forward and backward. The collector 12 is in sliding contact with electrical feeder wires 11 (see FIG. 2) extending along one side of the guide rail 2. The front end of the loading bar 5 is connected to a vertical shaft 13 hanging downward from the trolley body 7, and it is rockable sideways.

The idler trolley 4 has a trolley body 14 located at the one side of the guide rail 2, a freely rotatable wheel 16, and lateral rollers 17. The freely rotatable wheel 16 is adapted to roll on the upper surface of the guide rail 2 and is supported by a horizontal shaft 15 extending from a bearing which is secured to a top of the trolley body 14. The lateral rollers 17 are journaled on vertical shafts and are disposed on both sides of the guide rail. The top and bottom portions of the guide rail are contacted by the lateral rollers 17 to keep the idler trolley from rocking sideways or forward and backward. The rear end of the loading bar 5 is connected to a vertical shaft 18 depends from the trolley body 14 and is rockable sideways.

Figure 3:
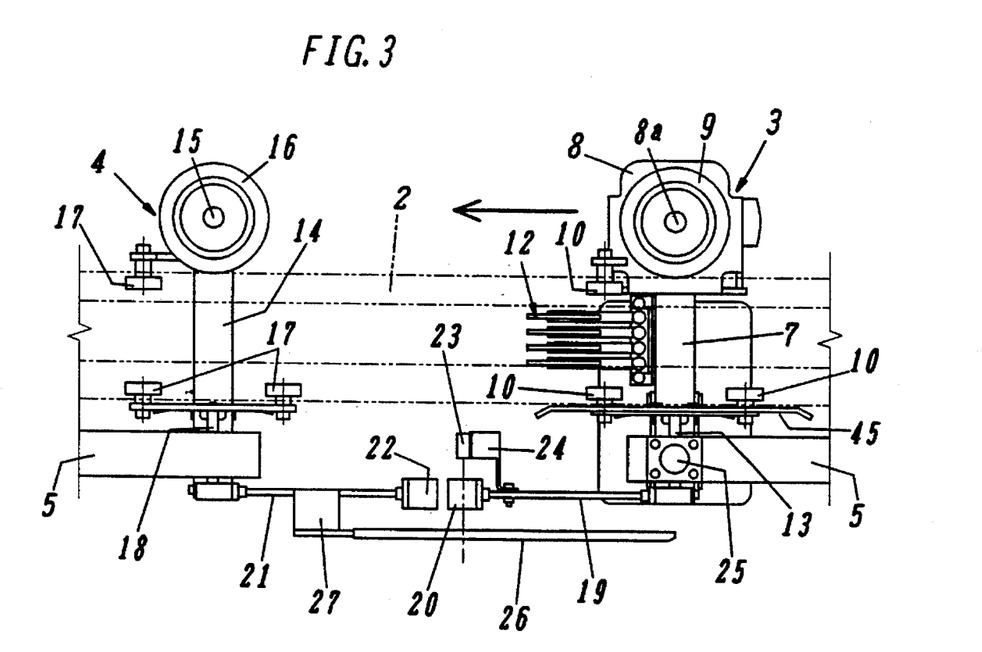
FIG. 3 is another side elevational view of the system of FIG. 1 showing a preceding electric mover halted by a following mover.
Figure 4:
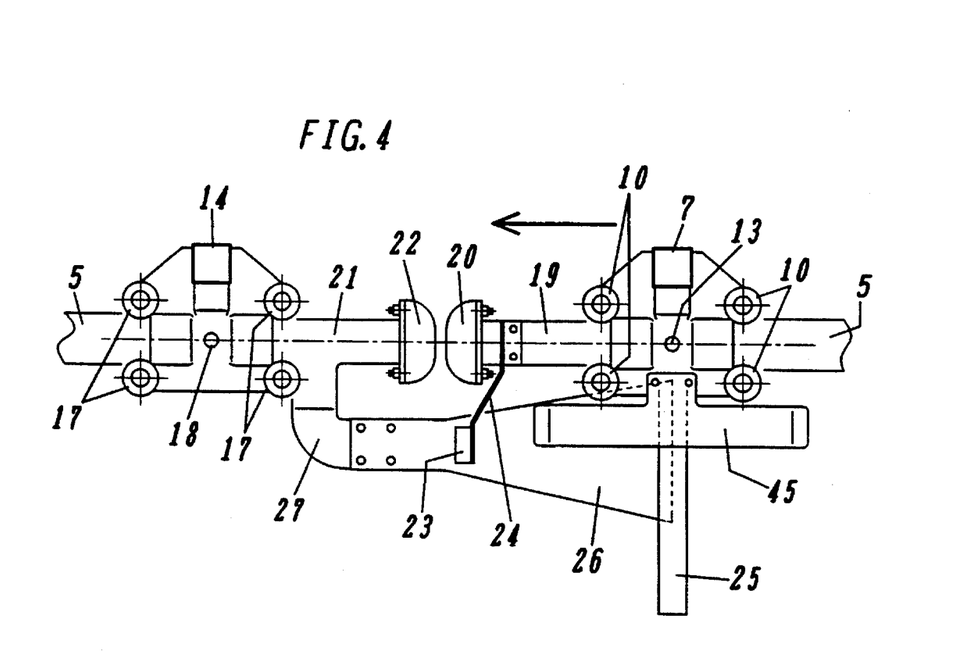
FIG. 4 is a plan view of portions of the electric movers shown in FIG. 3, with some parts shown in horizontal cross section.

As best seen in FIGS. 3 and 4, the drive trolley 3 has a forward lug 19 protruding from a lower end of the trolley body 7 below the loading bar 5. A bumper 20 is attached to the forward end of the lug 19, which is the foremost end of the electric mover 1. Similarly, the idler trolley 4 has a rearward lug 21 protruding from a lower end of the trolley body 14, located below the loading bar 5. A bumper 22 is attached to the rearward end of the lug 21, which is the rearmost end of the electric mover 1.

A photoelectric switch 23 attached by a bracket 24 to the forward lug 19, serves to stop the electric mover. The photoelectric switch 23 is located above and beside the bumper 20, on the side thereof opposite to the trolley body 7. The switch 23 can open the power connection of the electric mover 1 for stopping its movement when the proximity of another object is sensed by the switch.

A contact member 25 is a rod extending sideways and outwardly from a portion of the loading bar 5, with the portion located behind photoelectric switch 23, and serves to halt the electric mover. A fan shaped first detectable member 26 is mounted by a bracket 27 from the rearward lug 21 below the bumper 22. The member 26 has a rearward extending width and projects from a preceding electric mover 6 be sensed by the photoelectric switch 23 of a following electric mover when it approached the preceding mover closer than by a predetermined distance.

Figure 5:
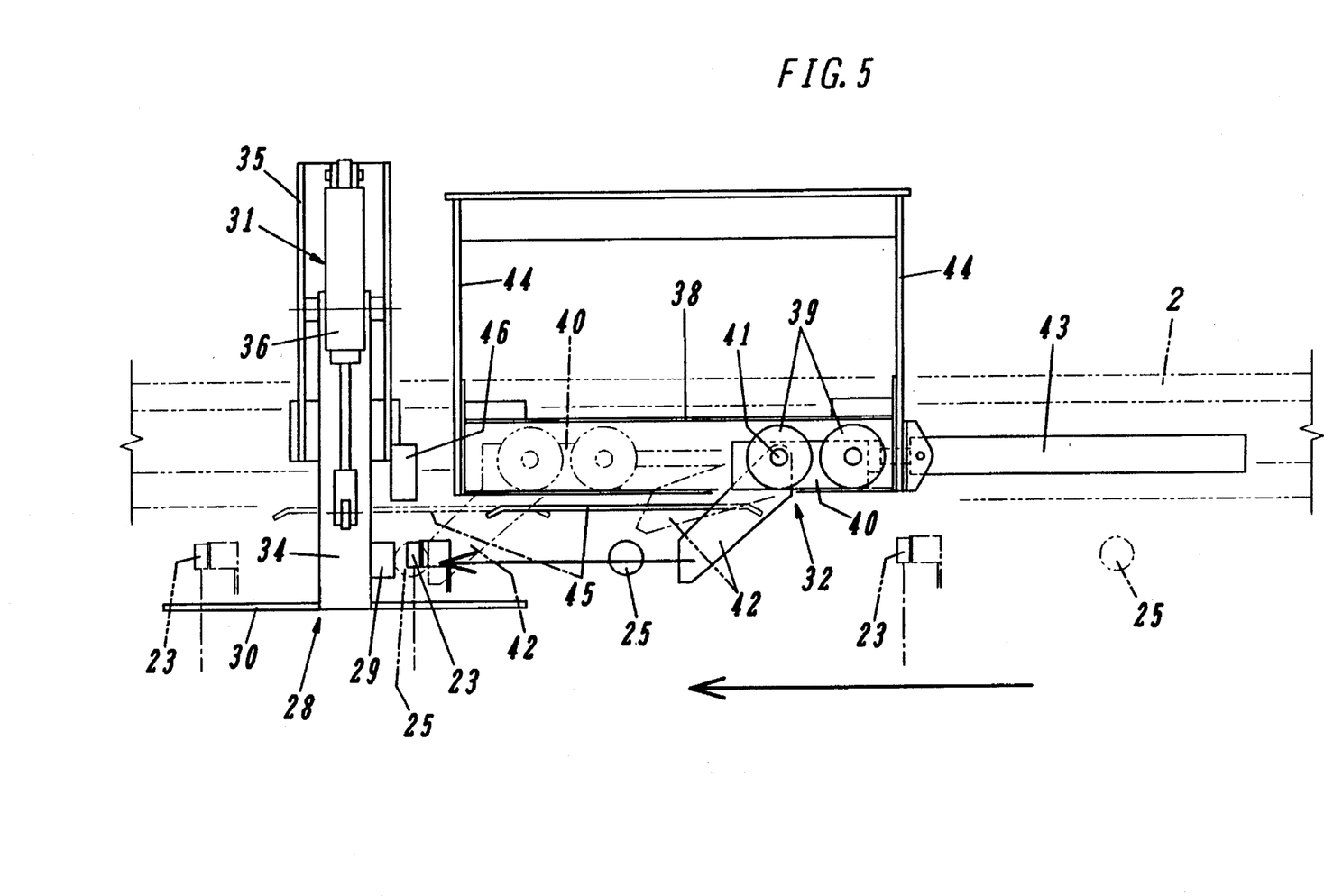
FIG. 5 is a side elevational view of a mechanism for stopping the electric movers.
Figure 6:
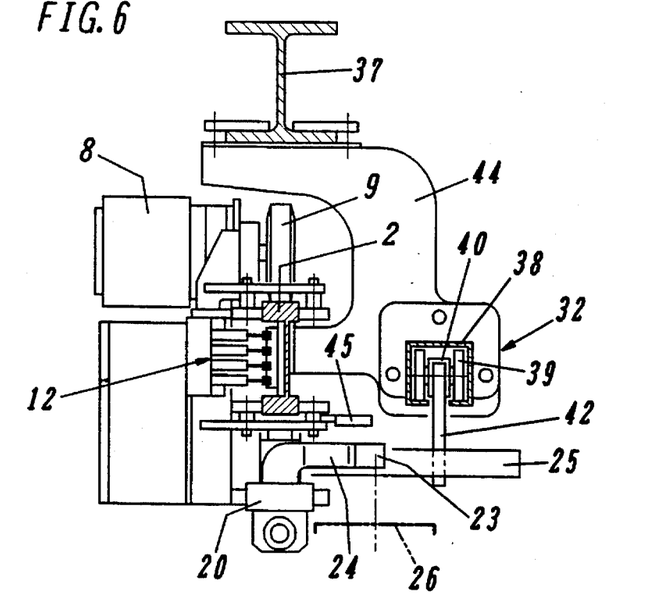
FIG. 6 is a front elevational view of an electric mover shown together with a positioning means of the stopping mechanism, with parts shown in cross section.
Figure 7:
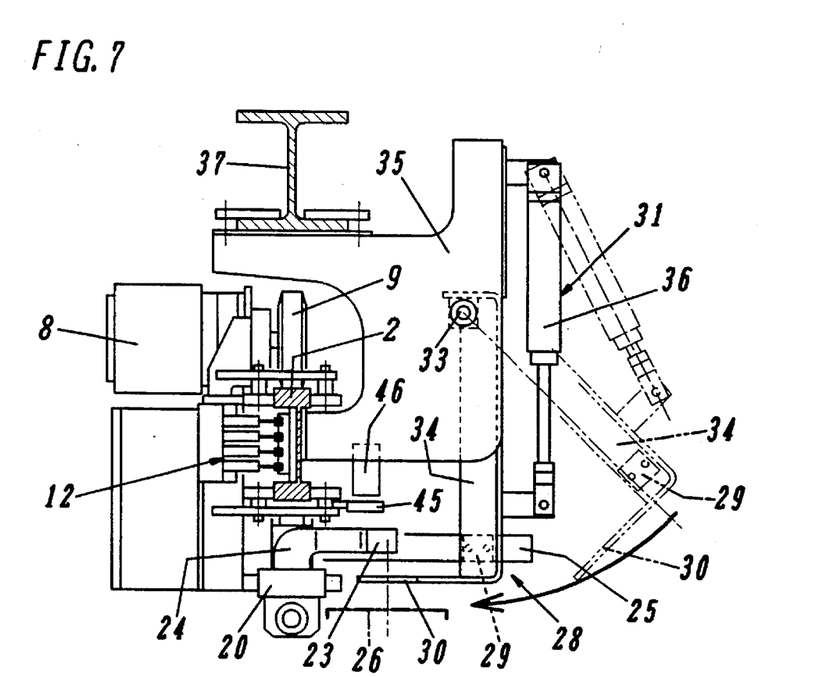
FIG. 7 is another front elevational view of the mover together with a stopper and a second detectable member, with some parts shown in cross section.

FIGS. 5 to 7 show a stopping mechanism 28 located at a station where each electric mover 1 has to be temporarily halted. The stopping mechanism 28 has a stopper member 29, a second detectable member 30 to be sensed by the photoelectric switch 23, a shifter 31 and a positioner 32. The stopper 29 can bear against the contact member 25 of the electric mover to halt it in place. The shifter 31 shifts the stopper member 29 and the second detectable member 30 between their operative position depicted by the solid lines in FIGS. 5 and 7 and their nonoperative, retracted position shown in broken lines in FIG. 7.

The second detectable member 30 is formed integrally with or is attached to the lower end of a rockable arm 34. This arm 34 is swingable sideways about a shaft 33 which is disposed parallel to the direction of travel of the electric mover 1, shown by an arrow in FIG. 5. The second detectable member 30 takes its horizontal and operative position when the rockable arm 34 is vertically positioned. In that operative position the second detectable member 30 extends forwardly and rearwardly from the rockable arm 34 will vertically intervene between the photoelectric switch 23 of a following mover and the first detectable member 26 of a preceding mover.

The stopper member 29 is made of a shock absorbing rubber or the like material and is attached to a lower side surface of the rockable arm 34. This lower surface, which in an alternative mode may itself substitute for the stopper, faces the electric mover which approaches the stopper. The shifter 31 is a pneumatic cylinder interposed between a frame 35 and the rockable arm 34 pivoted therefrom by the shaft 33. The frame 35 secures the guide rail 2 to a support beam 37 disposed thereabove.

The positioner 32 as shown in FIGS. 5 and 6 has an auxiliary guide rail 38 extending parallel with the direction of travel of the electric movers, a chassis 40, a pusher 42 and a cylinder unit 43 for driving the pusher. The chassis 40 is supported by traction wheels 39 and is movable along the auxiliary guide rail 38. The pusher 42 is vertically pivoted from the chassis by a transversely disposed horizontal shaft 41. The pusher 42 in its lowered operative position shown in a solid line in FIG. 5 is adapted to press the contact member 25 of the electric mover 1 against the stopper 29 when the stopper is in its lowered operative position. The lowered working position of the pusher is the normal lowest position towards which it is always urged by gravity or a by a spring. A frame 44 which supports the auxiliary guide rail 38 also secures the main guide rail 2 to the support beam 37, retaining both guide rails below the support beam.

In operation of the transporting system described above, the collector 12 receives power from the electric feeder wires 11 to energize the motor 8 to rotation. The motor rotates the drive wheel 9 and thereby causes the electric mover 1 to travel along the main guide rail 2. As the electric mover 1 arrives at the station where the stopping mechanism 28 is located and the stopping of the mover at the station is desired, the shifter 31 lowers the rockable arm 36 with the second detectable member 30 thereon. As the mover approaches the station, the photoelectric switch 23 enters a space above the second detectable member 30. Upon detection of the second detectable member 30 by the photoelectric switch 23, the supply of electricity to the motor 8 is immediately cut off, thus making it freely rotatable. The electric mover 1 travels further by a small distance due to inertia, until coming into contact with or stopping short of the stopper member 29. During such an inertial forward movement, the photoelectric switch 23 on the mover 1 continues to sense the elongated second detectable member 30, continuing to keep open the electric power circuit of the motor 8.

Thus, the second detectable member 30 sensed by the photoelectric switch 30 opens the power circuit but does not cause any immediate contact between the contact member 25 and the stopper member 29. This is because the second detectable member 30 is of such a length that the mover 1 is allowed to move inertially until the contact member 25 contacts or stops short of the stopper member 29.

As shown in FIG. 5, the contact member 25 of the stopped mover 1 is located between the pusher 42 of the positioner 32 and the stopper member 29. This is because the contact member 25 temporarily swung the pusher 41 upwardly into its retracted position shown in broken lines by passing under the pusher before the mover 1 stops. Then the cylinder unit 43 drives the chassis 40 forward. The contact member 25 is contacted and pushed forward by the pusher 42 until the contact member is pressed against the stopper member 29 to halt the electric mover 1 at a predetermined position.

The cylinder unit 43 of the positioner 32 activates the pusher 42 to push the electric mover forward to the stop 29, when in the operative position of the stopping mechanism the arrival of the mover into the vicinity of the pusher 42 is detected. This can be accomplished by the provision of a detectable plate 45 on the mover 1 above the contact member 25. A photoelectric switch 46 mounted from the guide rail 2, swings down together with the rockable arm 34 for sensing the proximity of the contact member 25 and to actuate the cylinder unit 43 of the positioner 42.

In summary, the photoelectric switch 23 of each electric mover 1 does not only sense the second detectable member 30 of the stopping mechanism 28, but also senses the first detectable member 26 of a preceding electric mover. In each occasion of said sensing the electric switch 23 will stop the electric mover, when it sensed a detectable member 30 or 26. In that case the sensor switch 23 of a following mover 1 approaching the preceding mover 1 halted by the positioner 32, enters the space above the first detectable member 26 of the preceding mover as shown in FIGS. 3 and 4, and will thereby sense it. As a result, the power is cut off to the motor 8 that rotates the drive wheel 9 of the following mover 1. The motor 8 thus rendered freely rotatable will allow the following mover 1 to make an inertial forward movement up to a certain distance, until the forward bumper 20 of the succeeding mover contacts, or comes to a stop short of, the rearward bumper 22 of the preceding mover 1. During such an inertial movement, the photoelectric switch 23 in the following mover 1 continues to sense the first detectable member 2 of the preceding mover, so that the power circuit for the motor 8 continues to remain open.

The length of the first detectable member 26 is designed so that the rearward bumper 22 of the preceding mover will not immediately collide with the forward bumper 20 of the following mover when the photoelectric switch 23 cuts off the power when it senses the member 26 of the preceding mover. Thus, the inertial movement of the succeeding mover 1 continues until the forward bumper 22 collides with, or comes to a stop short of, the rearward bumper 20.

In this manner, following electric movers 1 will stop one after another automatically forming a row of movers with the leading mover 1 being stopped at the station by the stopping mechanism 28. When the leading mover 1 is to leave the station, the cylinder unit 36 pivots the rockable arm 34 upward about the shaft 33 so that the second detectable member 30 and the stopper member 29 in the stopping mechanism 28 are retracted to their nonoperative position. As the detectable member 30 is removed sideways from the space below the photoelectric switch 23, it stops sensing the presence of the detectable member 30 and the power circuit of the motor 8 is closed. The thus restarted motor 8 starts rotation of the drive wheel 9 and the leading mover 1 on its forward travel.

As the leading mover 1 travels forward, its first detectable member 26 is removed from the sensing range of the photoelectric switch 23 of the following electric mover. The power circuit of the motor 8 of the following electric mover starts to move it forward. The other following movers will similarly move forward one after another, until the foremost one of the following movers is stopped by the stopping mechanism 28.

The rockable arm 34 returns to its operative position to bring the detectable member 30 and the stopper member 29 into their operative positions shown in solid lines, when the departing leading mover's contact member 25 cleared the rockable arm 34. The switch 23 of the departing leading mover 1 which has moved forward no longer senses the second detectable member 30. The detectable plate 46 is no longer sensed by the additional photoelectric switch 45 when the contact member 25 has moved forward by a sufficient distance away from the rockable arm 34. In response to the non-sensing state of the additional switch 46, the cylinder unit 36 of the shifter 31 can return the detectable member 30 and stopper member 29 to their operative position.

When the second detectable member 30 and the stopper member 29 return to their operative position upon the departure of the leading mover 1, the first detectable member 26 of the departing electric mover passes by the station of the stopping mechanism 28. As this detectable member 26 moves along but below the operative second detectable member 30, there is no interference between those detectable members.

In an alternative mode, a timer 23a can be employed to delay the closing of power circuit for the motor 8 of the following mover, until the switch 23 advances of the preceding mover sufficiently so that it can no longer sense the detectable member 26. Thus the second detectable member 30 can return with the stopper member 29 to the operative position, after the first detectable member 26 of the departing mover has passed by them and before the succeeding photoelectric switch 23 arrives at the stopping mechanism. In this case, the second detectable member 30 can take its operative position also at the same level as the preceding detectable member 26.

The timer for resuming the delayed supply of power to the brakeless motor 8 after the change over of the switch 23 into its non-sensing state can also maintain a sufficient distance between preceding and following movers 1. This feature will be advantageous in that even if the travel path of the movers is curved and would increase resistance to the wheels 9 and 16 thereby decelerating the preceding mover 1, the following mover will not approach the preceding mover that its switch 23 would sense the detectable member 26 trailing from the preceding mover. Thus, a frequent starting and stopping of the following mover 1 at the entrance of the curved path region can be avoided.

In places such as an ascending path an auxiliary conveyor can be used to drive the movers 1 at a constant and probably lower speed. The electric wires 11 can be dispensed with to cut off power supply to the movers. The motor 8 will thus become idle to enable each mover 1 to be moved freely, so that for example a pusher of the auxiliary conveyor engages the contact member 25 and carries the mover forward at the desired constant speed. Power supply to any electric mover 1 can be cut off when maintenance work has to performed. The movers thus rendered idle can be moved manually during maintenance.

In the described embodiment, the pusher 42 of the positioner 32 is designed to press against the contact member 25 of the mover 1 to push it against the stopper member 29 in the stopping mechanism 28. As the rockable arm 34 could be subjected to considerable frictional resistance from the contact member 25 when the stopper member 29 is retracted into its nonoperative position.

Figure 8:
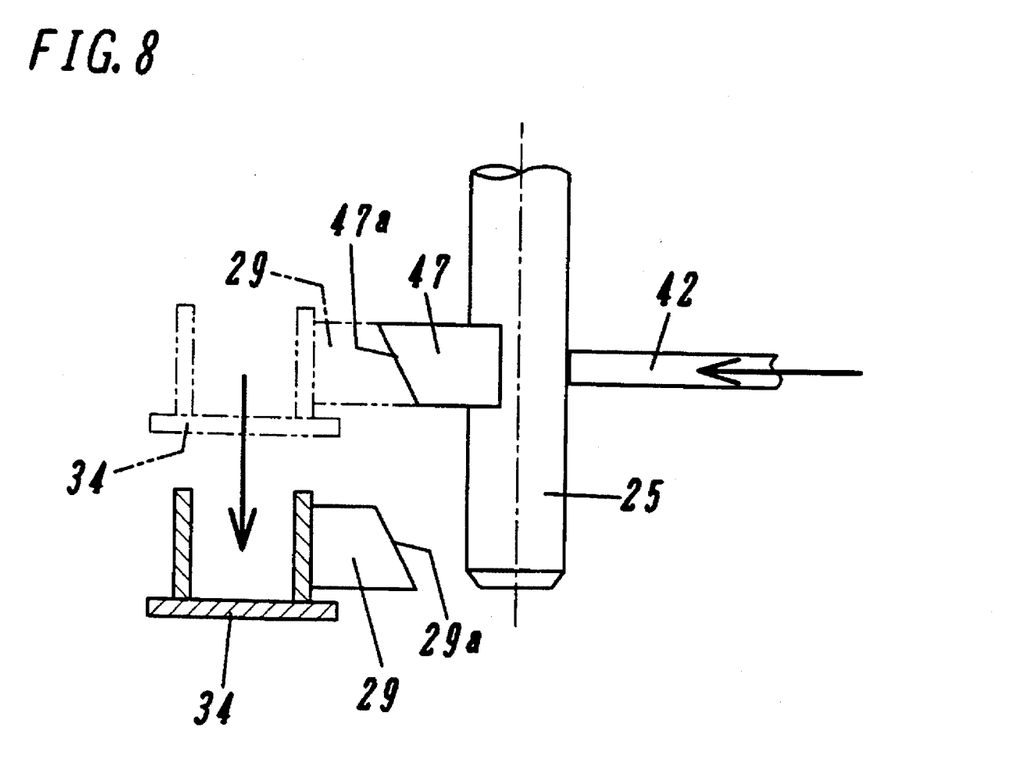
FIG. 8 is a plan view of modified parts in the system.

FIG. 8 shows a suitable device to avoid such a problem. In this device, the stopper member 29 has a slanted face 29a such that an acute edge of the surface 47a thereof does lead an obtuse edge on the oblique surface 29a when the rockable arm swings, to thereby take a position nearer the contact member 25 than the obtuse edge does. Correspondingly, the contact member 25 has a lug with a slanted face 47a to come into surface contact with the corresponding oblique surface 29a of the stopper member 29. The slanted surface can be either formed on the contact member 25, or on a separate piece 47 attached thereto.

The full scope of the invention is defined by the following claims.

We claim:
1. A transport system, comprising
 (i) an electrical mover for moving in a travel direction along a guide rail, and having
  (a) a drive wheel,
  (b) a brakeless electric motor for rotating said drive wheel,

(c) a photoelectric switch adapted to sense the proximity of an object, (d) a contact member for stopping movement of said electric mover at a predetermined location, said photoelectric switch being disposed in the travel direction ahead of said contact member for switching the supply of electrical power to said brakeless motor upon sensing or ceasing to sense a previously sensed proximity of an object, and (ii) a stopping mechanism located along the guide rail for stopping the movement of said electric mover, including (a) a stopper adapted in an operative position thereof to stop a moving electrical mover by contact with said contact member, and to allow movement of said electrical mover when said stopper is not in its operative position, (b) a shifter for shifting said stopper in and out of its operating position, and a detectable member connected to and shiftable by said shifter to a position perpendicularly to the travel direction, when said member is shifted to said perpendicular position, said member can be sensed by said photoelectric switch before contact between said stopper and said contact member.

2. The transport system of claim 1, wherein said detectable member is a second detectable member, the system further comprising a plurality of electric movers wherein a preceding electric mover is followed by a following electrical mover, each of said movers comprising a first detectable member extending in the travel direction rearwardly from each said electric mover for being sensed by said photoelectric switch of a said following electric mover for cutting off the supply of power to the motor of said following electric mover when said following electric mover approaches said preceding electric mover to within a predetermined distance.

3. The transport system of claim 2, further comprising delaying means for delaying the restoration of power to the electric motor of one said electric mover by a predetermined time period after said photoelectric switch ceased sensing said second detectable member.

4. The transport system of claim 2, wherein said second detectable member is disposed at a different level than said first detectable member.

5. The transport system of claim 2, wherein said stopping mechanism further comprises a rockable arm, and a shaft disposed parallel to the travel direction, said rockable arm being mounted for pivoting in a direction perpendicular to the travel direction into and out of a stopping position about said shaft, said second detectable member and said stopper are each mounted from said rockable arm, and said contact member of each said electric mover is an elongated member protruding from said electric mover perpendicularly to the travel direction for contact with said stopper when said rockable arm is in said stopping position.

6. The transport system of claim 5, wherein said stopping mechanism further comprises a pusher for urging the contact member of said electric mover into contact with said stopper.

7. The transport system of claim 6, wherein said stopper has a slanting surface having an acute edge leading to an obtuse edge upon said rockable arm pivoting outwardly out of a stopping position, said contact member has a slanting surface for contact with said slanting surface of said stopper.

* * * * *